(12) United States Patent
Song

(10) Patent No.: US 8,611,721 B2
(45) Date of Patent: Dec. 17, 2013

(54) VIDEO PLAYING APPARATUS AND LOCATION SEARCH METHOD THEREOF

(75) Inventor: Min-suk Song, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 68 days.

(21) Appl. No.: 13/226,819

(22) Filed: Sep. 7, 2011

(65) Prior Publication Data

US 2012/0087635 A1    Apr. 12, 2012

(30) Foreign Application Priority Data

Oct. 8, 2010    (KR) ........................ 10-2010-0098233

(51) Int. Cl.
*H04N 9/80* (2006.01)
(52) U.S. Cl.
USPC ...................... 386/241; 386/353; 386/E5.003
(58) Field of Classification Search
USPC ..................................... 386/241, E5.001, 353
See application file for complete search history.

(56) References Cited

U.S. PATENT DOCUMENTS

| 5,630,005 | A | 5/1997 | Ort |
| 6,157,771 | A | 12/2000 | Brewer et al. |
| 2002/0122357 | A1* | 9/2002 | Negishi ...................... 369/30.11 |

FOREIGN PATENT DOCUMENTS

| EP | 0786909 A2 | 7/1997 |
| EP | 1274086 A2 | 1/2003 |

OTHER PUBLICATIONS

Extended European Search Report issued on Oct. 7, 2011 in the corresponding European Patent Application No. 11164748.3.

* cited by examiner

*Primary Examiner* — Gelek W Topgyal
*Assistant Examiner* — Girumsew Wendmagegn
(74) *Attorney, Agent, or Firm* — Sughrue Mion, PLLC

(57) ABSTRACT

A video playing apparatus includes a receiver which receives a video signal comprising a plurality of video frames and having no index information about location and time of the plurality of video frames; a user input unit which receives a target time for searching in the received video signal; a signal processor which processes and outputs a video signal corresponding to the target time; and a controller which calculates an average value of ratios of location change to time change by interpreting time and location of the plurality of video frames processed until receiving the target time among the plurality of video frames, when receiving the predetermined target time through the user input unit, and controls the signal processor to process and output the video signal of location corresponding to the target time on the basis of the calculated average value.

20 Claims, 4 Drawing Sheets

VIDEO PLAYING APPARATUS AND LOCATION SEARCH METHOD THEREOF

CROSS-REFERENCE TO RELATED APPLICATION

This application claims priority from Korean Patent Application No. 10-2010-0098233, filed on Oct. 8, 2010 in the Korean Intellectual Property Office, the disclosure of which is incorporated herein by reference.

BACKGROUND

1. Field

Apparatuses and methods consistent with the exemplary embodiments relate to a video playing apparatus and a location search method thereof, and more particularly, to a video playing apparatus and a location search method thereof in which a location requested for searching by a user can be searched in a video having no index information about a location and time of a video frame.

2. Description of the Related Art

In the related art, while playing a video, a video playing apparatus supports location searching in a reverse or forward direction according to a user's selection. When searching a location in the forward direction, a related art video playing apparatus searches the location by collecting location information corresponding to a moving target time on the basis of index information about location and time involved in the video. If there is no index information about the location and time, the location corresponding to the target time is calculated in real time.

FIG. 1 shows a related art method of searching a location in video having no index information about the location and time. Start and end locations and start and end times of a moving picture are collected to acquire the whole section (S11), a location corresponding to the target time is calculated on the basis of a proportional expression (S12), and the move to the calculated location is achieved (S13). Then, the time information of the moved location is acquired (S14), and the target time and the acquired time information of the moved location are compared (S15). If a comparison result is within an error range, the searching is completed. If the comparison result is beyond the error range, a searching section is renewed (S16) and the operations S12 to S15 are repeated until the comparison result is within the error range, thereby searching the location corresponding to the target time.

In the related art method, the searching operations have to be performed plural times until searching the location corresponding to the target time. Also, a plurality of video frames and a plurality of audio frames constitute a moving picture as a non-uniform size. Therefore it is impossible to move to the accurate start location if the location is searched by only the proportional expression. Accordingly, the number of times for searching the accurate locations of the video frame and/or the audio frame corresponding to the target time increases, and therefore much time is taken in searching time, thereby affecting search performance.

SUMMARY

Accordingly, one or more exemplary embodiments provide a video playing apparatus and a location search method thereof, improved in search performance by calculating and moving to a location corresponding to a target time on the basis of time and location information of each frame acquired while playing a moving picture, without performing repetitive searches and repetitively acquiring and ascertaining the time information.

According to an exemplary embodiment, a video playing apparatus comprises a receiver which receives a video signal comprising a plurality of video frames and comprising no index information about location and time of the plurality of video frames; a user input unit which communicates a target time for searching in the received video signal; a signal processor which processes and outputs a video signal corresponding to the target time; and a controller which calculates an average value of ratios of location change to time change by interpreting time and location of each video frame processed until receiving the target time among the plurality of video frames, when receiving the target time through the user input unit, and controls the signal processor to process and output the video signal of location corresponding to the target time on the basis of the calculated average value.

The controller may comprise a ratio calculator which interprets time and location of each video frame processed until receiving the target time and calculates a ratio of location change to time change with respect to a first start point of the video signal.

The controller may comprise an average calculator which calculates an average value of updated ratios of the respective video frames on the basis of the ratio calculated by the ratio calculator, and generate an arithmetic expression for location to discretionary time on the basis of the calculated average value.

The controller may comprise a search mover which performs moving to location of a video signal corresponding to the target time on the basis of the arithmetic expression generated by the average calculator.

The video playing apparatus may further comprise a storage unit which stores the average value of the updated ratios of the respective video frames calculated by the average calculator.

The receiver may receive an audio signal comprising a plurality of audio frames and comprising no index information about location and time of the plurality of audio frames The signal processor processes and outputs an audio signal corresponding to the predetermined target time; and the controller calculates an average value of ratios of location change to time change by interpreting time and location of each audio frame processed until receiving the target time among the plurality of audio frames, when receiving the target time through the user input unit, and controls the signal processor to process and output the audio signal of location corresponding to the target time on the basis of the calculated average value.

The ratio calculator may interpret time and location of each audio frame processed until receiving the target time and calculate a ratio of location change to time change with respect to a first start point of the audio signal.

The average calculator may calculate an average value of the ratio calculated by the ratio calculator, and generate an arithmetic expression for location to discretionary time on the basis of the calculated average value.

The search mover may perform moving to location of an audio signal corresponding to the target time on the basis of the arithmetic expression generated by the average calculator.

The storage unit may store the average value of the updated ratios of the respective audio frames calculated by the average calculator.

According to another exemplary embodiment, a location search method of a video playing apparatus comprises receiving a video signal comprising a plurality of video frames and comprising no index information about location and time of the plurality of video frames; processing and outputting the received video signal; calculating an average value of ratios of location change to time change by interpreting time and location of the respective processed video frames; receiving a target time for searching in the received video signal; and processing and outputting the video signal of location corresponding to the target time on the basis of the average value of the respective video frames calculated until receiving the target time.

The calculating the average value may comprise interpreting time and location of each video frame processed until receiving the target time, and calculating a ratio of location change to time change with respect to a first start point of the video signal.

The calculating the average value may comprise calculating an average value of updated ratios of the respective video frames on the basis of the ratio calculated in the calculating the ratio, and generating an arithmetic expression for location to discretionary time on the basis of the calculated average value.

The outputting the video signal may comprise moving to location of a video signal corresponding to the target time on the basis of the arithmetic expression generated in the calculating the average value.

The location search method may further comprise storing the average value of the updated ratios of the respective video frames calculated in the calculating the average value.

The receiving the video signal may comprise receiving a audio signal comprising a plurality of audio frames and comprising no index information about location and time of the plurality of audio frames.

The calculating the ratio may comprise interpreting time and location of each audio frame processed until receiving the target time and calculating a ratio of location change to time change with respect to a first start point of the audio signal.

The calculating the average may comprise calculating an average value of the ratio calculated in the calculating the ratio, and generating an arithmetic expression for location to discretionary time on the basis of the calculated average value.

The moving to the location of a video signal corresponding to the target time may comprise moving to location of an audio signal corresponding to the target time on the basis of the arithmetic expression generated in the calculating the average value.

The location search method may further comprise storing the average value of the updated ratios of the respective audio frames calculated in calculating the average value.

BRIEF DESCRIPTION OF THE DRAWINGS

The above and/or other aspects will become apparent and more readily appreciated from the following description of the exemplary embodiments, with reference to the accompanying drawings, in which.

DETAILED DESCRIPTION OF THE EXEMPLARY EMBODIMENTS

Figure 1:
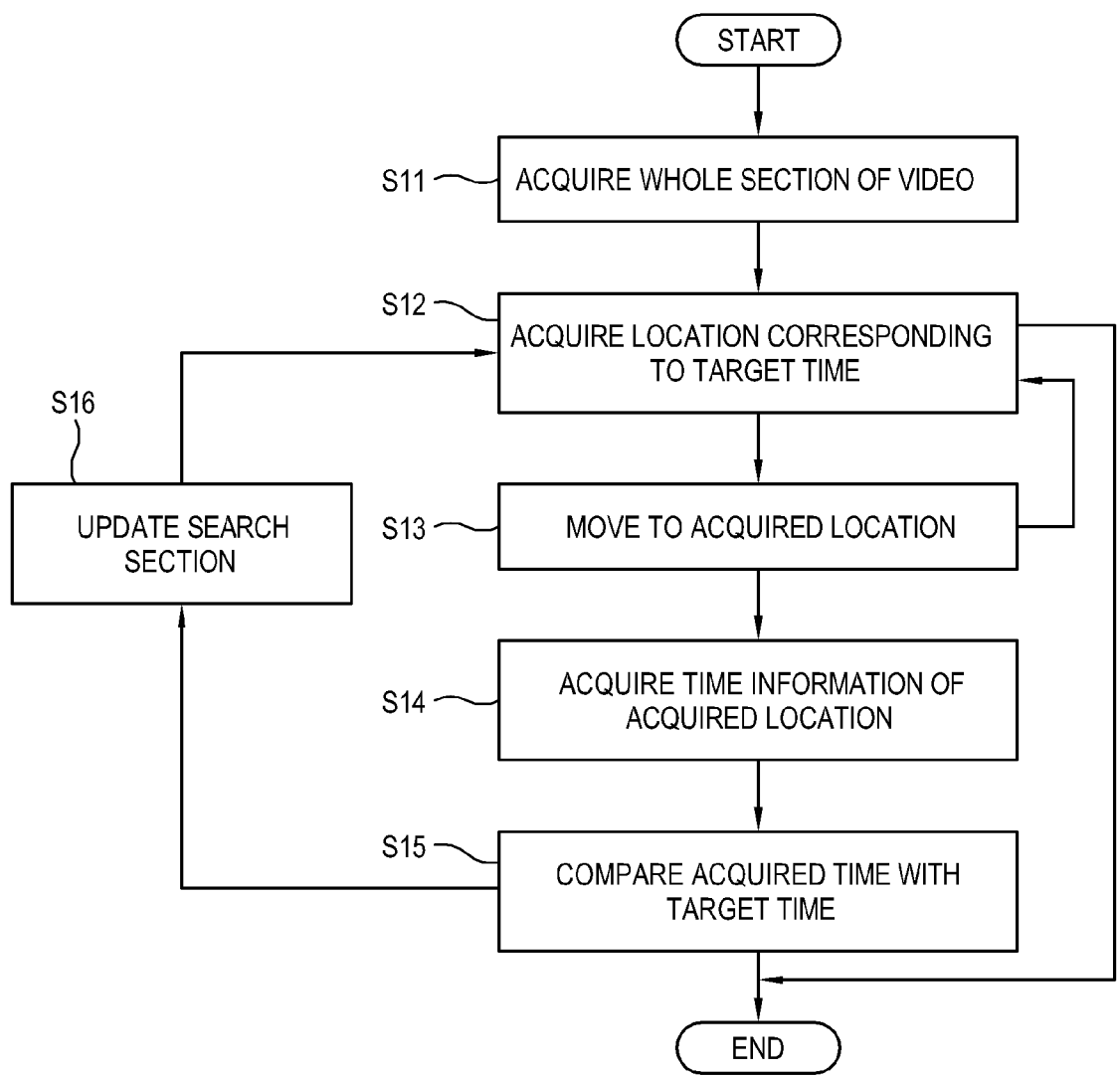
FIG. 1 is a flowchart showing a location search method of a related art video playing apparatus.

Exemplary embodiments will now be described in detail with reference to accompanying drawings so as to be realized by a person having ordinary knowledge in the art. The exemplary embodiments may be embodied in various forms without being limited to the exemplary embodiments set forth herein. Descriptions of well-known parts may be omitted for clarity, and like reference numerals refer to like elements throughout.

Figure 2:
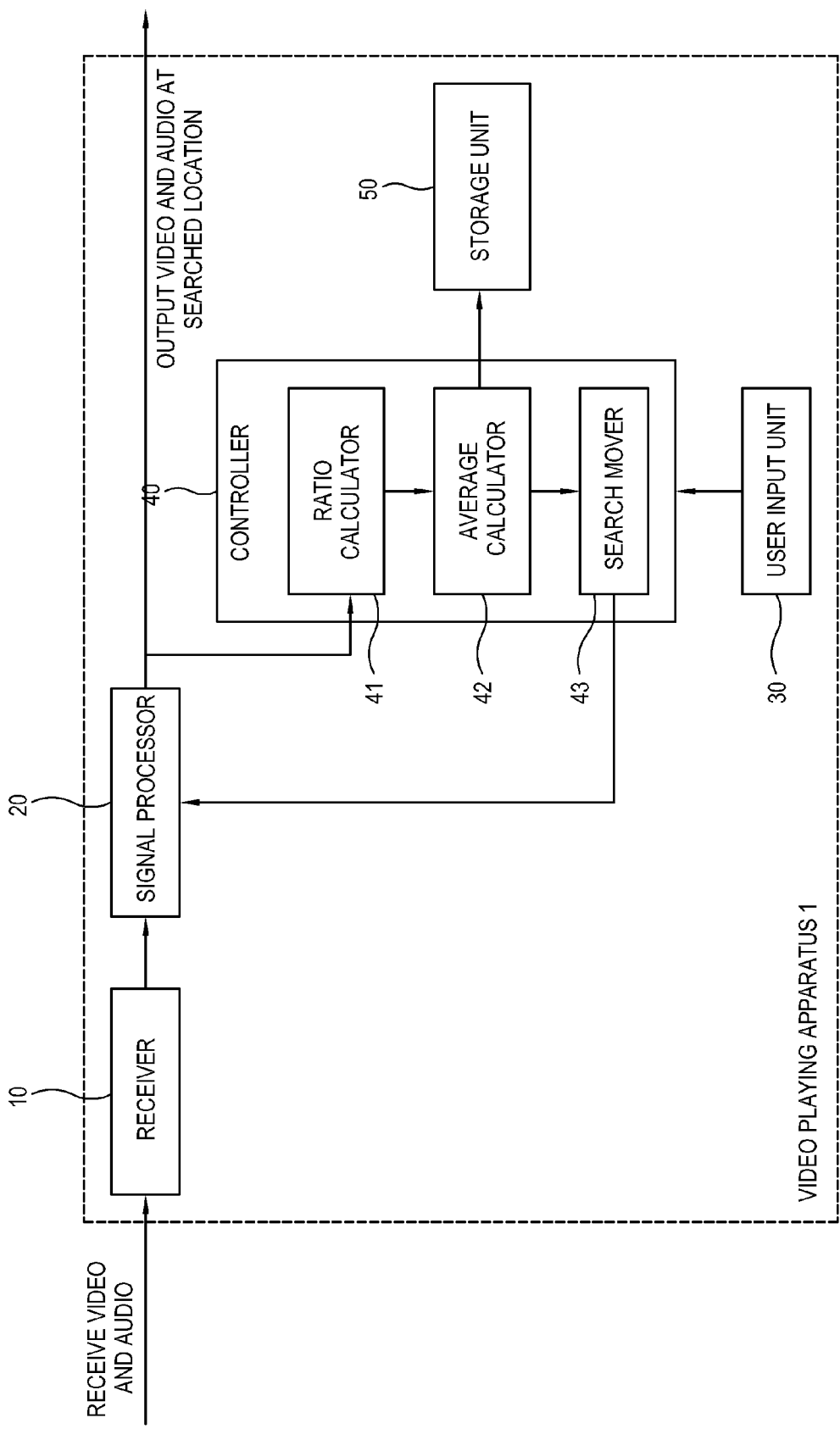
FIG. 2 is a control block diagram of a video playing apparatus according to an exemplary embodiment.

FIG. 2 is a control block diagram of a video playing apparatus according to an exemplary embodiment.

A transport stream (TS) based on moving picture experiment group (MPEG) contains program clock reference (PCR) information, and the PCR information involves index information about time and location of each frame included in the TS. Thus, a location about a target time to which a user wants to move can be easily searched on the basis of index information.

The video playing apparatus in this exemplary embodiment receives a video signal having no index information about the time and location. Thus, a receiver 10 can receive any kind of video signal involving no index information about the time and location. For example, the format of the video signal may include mkv, asf, avi, etc., but is not limited thereto, and other formats as would be understood by one skilled in the art may be substituted therefor.

The video playing apparatus 1 in this exemplary embodiment may include any type of electronic apparatuses capable of reproducing video. For example, the video playing apparatus 1 may be achieved by a digital versatile disc (DVD)/Bluray disc (BD) player, a personal video recorder (PVR), a personal computer (PC), a television (TV), etc. but is not limited thereto, and any other video playing apparatus as would be understood by one skilled in the art may be substituted therefor.

The video playing apparatus 1 includes the receiver 10, a signal processor 20, a user input unit 30 and a controller 40.

The receiver 10 receives a video signal (e.g., predetermined), which contains a plurality of video frames without the index information about the location and time of the plurality of video frames, from an external video source (not shown), and transmits the video signal to the signal processor 20. The receiver 10 can be achieved in various forms corresponding to the standards of the video signal and the type of the video playing apparatus 1. The receiver 10 may receive a video signal (e.g., predetermined) from an external storage medium (not shown) such as a universal serial bus (USB) or the like.

The receiver 10 may receive any kind of video signals having no index information about the time and location. For example, the format of the video signal may include mkv, asf, avi, etc., as explained above.

The receiver 10 receives an audio signal (e.g., predetermined), which contains a plurality of audio frames without the index information about the location and time of the plurality of audio frames, together with the video signal, and transmits the audio signal to the signal processor 20.

The signal processor 20 processes a video signal (e.g., predetermined) received through the receiver 10 and outputs video corresponding to the processed video signal to a display unit (not shown). Also, the signal processor 20 may process and output a video signal corresponding to a search-requested location under control of the controller 40.

The signal processor 20 performs various video processes previously set up with respect to a video signal. The kind of video processes is not limited, and for example but not by way of limitation, the video processes may include decoding and encoding, de-interlacing, frame refresh rate conversion, scaling, noise reduction, detail enhancement, line scanning, etc. corresponding to various video formats; other video processes as would be understood by one skilled in the art may be substituted therefor. The signal processor 20 may perform the video processes individually or together.

The signal processor 20 may process the audio process received along with the video signal through the receiver 10. Also, the signal processor 20 may process and output an audio signal corresponding to a search-requested location under control of the controller 40.

The signal processor 20 performs various audio processes previously set up with respect to an audio signal. The kind of audio processes is not limited, and for example but not by way of limitation, the audio processes may include digital conversion of an analog audio signal, amplification of an audio signal, output level control of an audio signal, frequency compensation for an audio signal, etc.; other audio processes as would be understood by one skilled in the art may be substituted therefor. The signal processor 20 may perform the audio processes individually or together.

The user input unit 30 receives from a user and communicates to the controller 40 a target time (e.g., predetermined) for searching in the received video signal.

The user input unit 30 may be provided in the form of a button on the video playing apparatus 1; a touch panel on a display panel of the display unit (not shown); and a wired/wireless-connectable keyboard, mouse or remote controller. The user input unit 30 may be provided without limiting its form as long as it can receive a user's selection.

When receiving the target time (e.g., predetermined) through the user input unit 30, the controller 40 calculates an average value of ratios of location change to time change by interpreting the time and location of each video frame, processed until the target time (e.g., predetermined) is received, among the plurality of video frames, and controls the signal processor 20 to process and output a video signal located corresponding to the target time on the basis of the calculated average value.

The controller 40 includes a ratio calculator 41, an average calculator 42, and a search mover 43.

If a target time (e.g., predetermined) for searching is received through the user input unit 30 while a video signal (e.g., predetermined) received through the receiver 10 is processed and output by the signal processor 20, the ratio calculator 41 acquires time and location information (byte position) of each video frame by interpreting the time and location of each video frame processed until receiving the target time among the plurality of video frames. On the basis of the acquired time and location information, a ratio of location to time of each video frame is calculated with respect to a first start point of the video signal.

The average calculator 42 calculates an average value of the calculated ratios of location to time of each video frames, and generates an arithmetic expression of location to discretionary time on the basis of the calculated average value.

The search mover 43 performs moving to a target location derived by substituting a target time (e.g., predetermined) received through the user input unit 30 into the arithmetic expression.

Thus, the controller 40 controls the signal processor 20 to process and output an audio signal corresponding to a target position moved by the search mover 43.

A storage unit 50 continuously stores the average value of the ratios of location to time of each video frame and the average value of the ratios of location to time of each audio frame, which are calculated by the average calculator 42.

Figure 3:
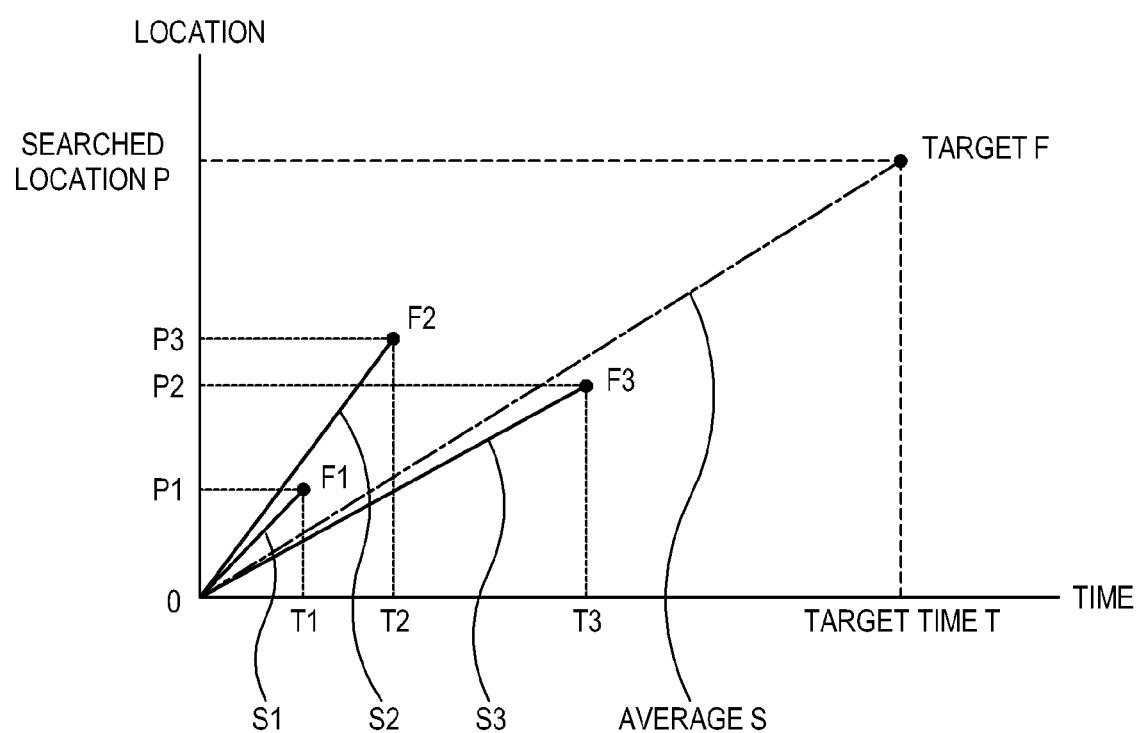
FIG. 3 illustrates operation of a controller of the video playing apparatus according to an exemplary embodiment.

FIG. 3 illustrates operation of a controller of the video playing apparatus according to an exemplary embodiment. The video playing apparatus in this exemplary embodiment receives, processes and outputs a video signal having no index information about time and location of each frame. A target time for searching is received through the user input unit 30.

As shown in FIG. 3, the video playing apparatus processes and outputs discretionary first to third frames F1~F3 in the video signal until receiving the target video time. While processing and outputting the first to third frames, the controller 40 of the video playing apparatus 1 interprets the time and location information of each frame.

That is, the ratio calculator 41 acquires the location information P1 corresponding to the byte position and the start time T1 of the first frame with respect to the first start point of the video signal. This is equivalently applied to the second frame and the third frame.

The ratio calculator 41 obtains the ratios S1~S3 of location to time of the first to third frames, respectively.

The average calculator 42 calculates the average value S (average) of the ratios S1 to S3 of location to time of the first to third frames, respectively. Further, the average value S (average) is used for generating the arithmetic expression of location to discretionary time.

If a target time (e.g., predetermined) for searching is received through the user input unit 30, the location information P (searched location) is derived by substituting the target time into the generated arithmetic expression, and the search mover 43 performs moving to the derived location, i.e., the target frame F (target).

The controller 40 controls the signal processor 20 to process and output the video signal corresponding to the location moved by the search mover 43.

The control of the controller 40 is equivalently applied to searching for an audio signal.

The accuracy in searching of the video playing apparatus in this exemplary embodiment may be adjusted as the number of frames played by the signal processor 20 changes. Although each video frame included in the video signal and each audio frame included in the audio signal have various sizes and times, the accuracy in searching is may vary from the related art search method based on the proportional expression.

Also, with regard to all frames processed and output by the signal processor 20 until a search request is received through the user input unit 30, the time and location information is acquired, and the average value of their ratios is calculated and stored in the storage unit 50. Thus, when the search request is received through the user input unit 30, it is at once possible to directly move to the location corresponding to the target time on the basis of the arithmetic expression generated using the average value stored in the storage unit 50

Accordingly, the video playing apparatus in this exemplary embodiment need not repetitively search and continuously collect the time information corresponding to the respective searches, which are needed in searching based on the related art proportional expression.

Figure 4:
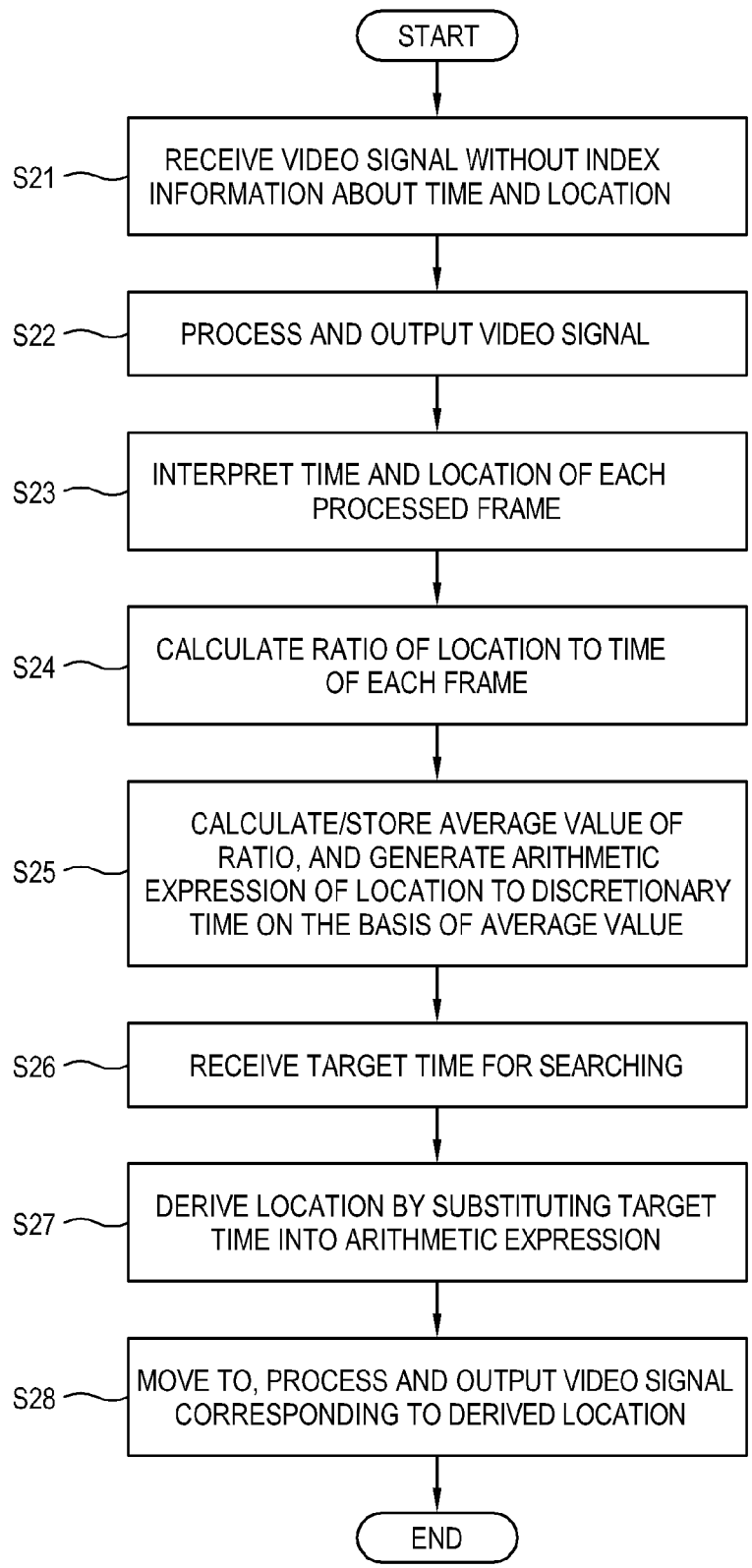
FIG. 4 is a flowchart showing a location search method of a video playing apparatus according to an exemplary embodiment.

FIG. 4 is a flowchart showing a location search method of a video playing apparatus according to an exemplary embodiment.

If a video signal (e.g., predetermined) containing a plurality of video frames and having no index information about location and time of the plurality of video frames is received through the receiver 10 (S21), the received video signal is processed and output by the signal processor 20 (S22).

The ratio calculator 41 interprets the time and location of every processed and output frame (S23), and calculates the ratio of location change to time change with respect to the first start point of the video (S24).

The average calculator 42 calculates the average value of the calculated ratios of the respective frames, and generates the arithmetic expression for location to discretionary time on the basis of the calculated average value, and the calculated average value is stored in the storage unit 50 (S25).

A target time (e.g., predetermined) for searching in the output video signal is input through the user input unit 30 (S26).

The location is derived by substituting the received target time into the generated arithmetic expression (S27), the search mover 43 performs moving to a video signal corresponding to the derived location, and the signal processor 20 processes and outputs the video signal (S28).

The operations S23 to S25 are repetitively performed with respect to each frame from a point of time when the received video signal is processed and output by the signal processor 20, so that the average value can be continuously updated and stored in the storage unit 50.

Thus, at a point of time when the target time for searching is received through the user input unit 30, the arithmetic expression for location to discretionary time is generated on the basis of the updated average value stored in the storage unit 50, so that the location can be derived by substituting the target time into the arithmetic expression.

The foregoing control of the controller 40 is equivalently applied to an audio signal including a plurality of audio frames and having no index information about time and location, so that moving-to, processing and outputting can be performed for the location of the audio signal corresponding to the target time a user wants to search.

As described above, there are provided a video playing apparatus and a location search method thereof, improved in search performance by calculating and moving to a location corresponding to a target time on the basis of time and location information of each frame acquired while playing a moving picture, without performing repetitive searches and repetitively acquiring and ascertaining the time information.

The above-described embodiments can also be embodied as computer readable codes which are stored on a computer readable recording medium (for example, non-transitory, or transitory) and executed by a computer or processor. The computer readable recording medium is any data storage device that can store data which can be thereafter read by a computer system, including the video apparatus.

Examples of the computer readable recording medium include read-only memory (ROM), random-access memory (RAM), CD-ROMs, magnetic tapes, floppy disks, optical data storage devices, and carrier waves such as data transmission through the Internet. The computer readable recording medium can also be distributed over network coupled computer systems so that the computer readable code is stored and executed in a distributed fashion. Also, functional programs, codes, and code segments for accomplishing the embodiments can be easily construed by programmers skilled in the art to which the disclosure pertains. It will be understood that various modifications may be made. For example, suitable results may be achieved if the described techniques are performed in a different order and/or if components in a described system, architecture, device, or circuit are combined in a different manner and/or replaced or supplemented by other components or their equivalents.

Although a few exemplary embodiments have been shown and described, it will be appreciated by those skilled in the art that changes may be made in these exemplary embodiments without departing from the principles and spirit of the inventive concept as defined by the following claims, the scope of which is defined in the appended claims and their equivalents.

What is claimed is:

1. A video playing apparatus comprising:
   a receiver configured to receive a video signal comprising a plurality of video frames, wherein the video signal does not contain index information about times and locations of the plurality of video frames;
   a user input unit configured to receive a target time from a user, the target time being for searching the received video signal;
   a signal processor configured to process the video signal and output a processed video signal corresponding to the target time; and
   a controller configured to calculate an average value of ratios of location changes to time changes by interpreting times and locations of the plurality of video frames of the processed video signal until the target time is received through the user input unit, and configured to control the signal processor to process the video signal and output the processed video signal at a location corresponding to the target time based on of the calculated average value.

2. The video playing apparatus according to claim 1, wherein the controller comprises a ratio calculator configured to interpret the times and the locations of the plurality of video frames processed until the target time is received, and configured to calculate a ratio of location change to time change with respect to a first start point of the processed video signal.

3. The video playing apparatus according to claim 2, wherein the controller comprises an average calculator configured to calculate an average value of updated ratios of the plurality of video frames based on the ratio calculated by the ratio calculator, and configured to generate an arithmetic expression for location to discretionary time based on the calculated average value.

4. The video playing apparatus according to claim 3, wherein the controller comprises a search mover configured to perform moving to a location of the processed video signal corresponding to the target time based on the arithmetic expression generated by the average calculator.

5. The video playing apparatus according to claim 4, further comprising a storage unit configured to store the average value of the updated ratios of the plurality of video frames calculated by the average calculator.

6. The video playing apparatus according to claim 5, wherein the receiver receives an audio signal comprising a plurality of audio frames and not containing index information about times and locations of the plurality of audio frames;
   the signal processor processes the audio signal and outputs a processed audio signal corresponding to the target time; and
   the controller calculates an average value of ratios of location changes to time changes by interpreting times and locations of the plurality of audio frame that are processed until the target time is received through the user input unit, and controls the signal processor to process the audio signal and output the processed audio signal at a location corresponding to the target time based on the calculated average value.

7. The video playing apparatus according to claim 6, wherein the ratio calculator interprets the times and the locations of the plurality of audio frames of the processed audio signal until the target time is received, and calculates a ratio of location change to time change with respect to a first start point of the processed audio signal.

8. The video playing apparatus according to claim 7, wherein the average calculator calculates an average value of the ratio calculated by the ratio calculator, and generates an arithmetic expression for location to discretionary time based on the calculated average value.

9. The video playing apparatus according to claim 8, wherein the search mover performs moving to a location of the processed audio signal corresponding to the target time based on the arithmetic expression generated by the average calculator.

10. The video playing apparatus according to claim 9, wherein the storage unit stores the average value of the updated ratios of the plurality of audio frames calculated by the average calculator.

11. The location search method according to claim 9, further comprising storing the average value of the updated ratios of the plurality of audio frames calculated in calculating the average value.

12. A location search method of a video playing apparatus, the location search method comprising:
 receiving a video signal comprising a plurality of video frames, the video signal not containing index information about times and locations of the plurality of video frames;
 processing the video signal and outputting a processed video signal;
 calculating an average value of ratios of location changes to time changes by interpreting times and locations of the plurality of video frames of the processed video signal;
 receiving a target time for searching the received video signal; and
 processing the video signal and outputting the processed video signal at a location corresponding to the target time, the outputting of the processed video signal being based on the average value of the plurality of video frames calculated until the target time is received.

13. The location search method according to claim 12, wherein the calculating the average value comprises interpreting the times and the locations of the plurality of video frames processed until the target time is received, and calculating a ratio of location change to time change with respect to a first start point of the processed video signal.

14. The location search method according to claim 13, wherein the calculating the average value comprises calculating an average value of updated ratios of the plurality of video frames based on the ratio calculated in the calculating the ratio, and generating an arithmetic expression for location to discretionary time based on the calculated average value.

15. The location search method according to claim 14, wherein the outputting the processed video signal comprises moving to a location of the processed video signal corresponding to the target time based on the arithmetic expression generated in the calculating the average value.

16. The location search method according to claim 15, further comprising storing the average value of the updated ratios of the plurality of video frames calculated in the calculating the average value.

17. The location search method according to claim 16, wherein the receiving the video signal comprises receiving an audio signal comprising a plurality of audio frames, the audio signal not containing index information about times and locations of the plurality of audio frames.

18. The location search method according to claim 17, wherein the calculating the ratio comprises interpreting the times and the locations of the plurality of audio frames of the processed audio signal until the target time is received, and calculating a ratio of location change to time change with respect to a first start point of the processed audio signal.

19. The location search method according to claim 18, wherein the calculating the average comprises calculating an average value of the ratio calculated in the calculating the ratio, and generating an arithmetic expression for location to discretionary time based on the calculated average value.

20. The location search method according to claim 19, wherein the moving to the location of the processed video signal corresponding to the target time comprises moving to a location of the processed audio signal corresponding to the target time based on the arithmetic expression generated in the calculating the average value.

* * * * *